United States Patent [19]
Temming

[11] 3,874,494
[45] Apr. 1, 1975

[54] EQUIPMENT FOR HANDLING ROLLABLE ARTICLES
[75] Inventor: Leonardus Johannes Temming, Aalten, Netherlands
[73] Assignee: Staalkat B. V., Netherlands
[22] Filed: Feb. 28, 1973
[21] Appl. No.: 336,803

Related U.S. Application Data
[63] Continuation of Ser. No. 114,173, Feb. 10, 1971, abandoned.

[30] Foreign Application Priority Data
Feb. 2, 1970 Netherlands........................ 7001859

[52] U.S. Cl. ................................................ 198/30
[51] Int. Cl. ............................................ B65g 47/26
[58] Field of Search ............ 198/30, 29, 25; 356/57, 356/58

[56] References Cited
UNITED STATES PATENTS
2,620,059  12/1952  Niederer et al....................... 198/30
3,083,809  4/1963  Fischer ................................. 198/25
FOREIGN PATENTS OR APPLICATIONS
405,146  7/1966  Switzerland........................... 198/29

Primary Examiner—Evon C. Blunk
Assistant Examiner—Douglas D. Watts
Attorney, Agent, or Firm—Cushman, Darby & Cushman

[57] ABSTRACT
Randomly arranged rollable articles, such as eggs, on a conveyor belt are fed to a loader in single rows. Entrances to guiding channels reciprocate to avoid jamming and facilitate entrance. Resilient holddown elements prevent upward movement of articles.

2 Claims, 5 Drawing Figures

EQUIPMENT FOR HANDLING ROLLABLE ARTICLES

This is a continuation, of application Ser. No. 114,173 filed Feb. 10, 1971 now abandoned.

This invention relates to apparatus for feeding rollable articles, such as eggs, to a transporting roller of an automatic loader.

In apparatus of this kind, for example, as described in Dutch Patent Specification No. 130,267, the rollable articles are deposited on the receiving end of a feed conveyor in a random arrangement, and above the delivery end of the conveyor a plurality of channels are provided for feeding the articles to the contiguous transporting roller in rows, the channels being defined by elements comprising vertical partitions extending side by side in the direction of transport, at least part of the channel defining elements being arranged for movement transverse to the direction of transport.

One difficulty in prior apparatus of this kind is that jamming may occur at the entrance of the channels, which may result in breakage. A further disadvantage is that gaps are formed in the rows or files in the channels, so that all the cells of the transporting roller are not filled, resulting in the loader working short of capacity. Moreover, if the files are closed in the prior apparatus, an article at the delivery end of the channels may be pushed upward owing to the pressure from the articles fed behind it and be positioned beside the cells of the transporting roller, which, in the case of eggs, leads to breakage of the egg and fouling of the machine.

It is an object of the present invention to provide similar apparatus, in which, however, the above drawbacks and disadvantages have been overcome.

According to the invention, there is provided apparatus for feeding rollable articles, such as eggs, to a transporting roller of an automatic loader, comprising a feed conveyor at the receiving end of which the articles are deposited in a random arrangement, and above the delivery end of which a plurality of channels are formed for feeding the articles to the transporting roller in rows, said channels being defined by channel defining means comprising vertical partitions extending side by side in the direction of transport, said partitions being pivotable about vertical axes adjacent the delivery end of the conveyor, and having upstream ends capable of performing a transverse reciprocating movement. Preferably, the partitions are coupled in parallel relationship, and can perform a similar pivotal movement.

According to a further feature of the invention, in order to prevent the articles at the delivery end of the channels from being pushed upward, the channel defining means comprise hold-down elements arranged above the delivery end of the channels for vertical up-and-down movement, in particular spring elements terminating different heights above, and distances from, the delivery ends of the channels.

Further particulars will become apparent from the following description of a preferred embodiment of the apparatus according to the invention with reference to the accompanying diagrammatic drawings. In said drawings, FIG. 1 shows a plan view of part of the apparatus;

Figure 1:
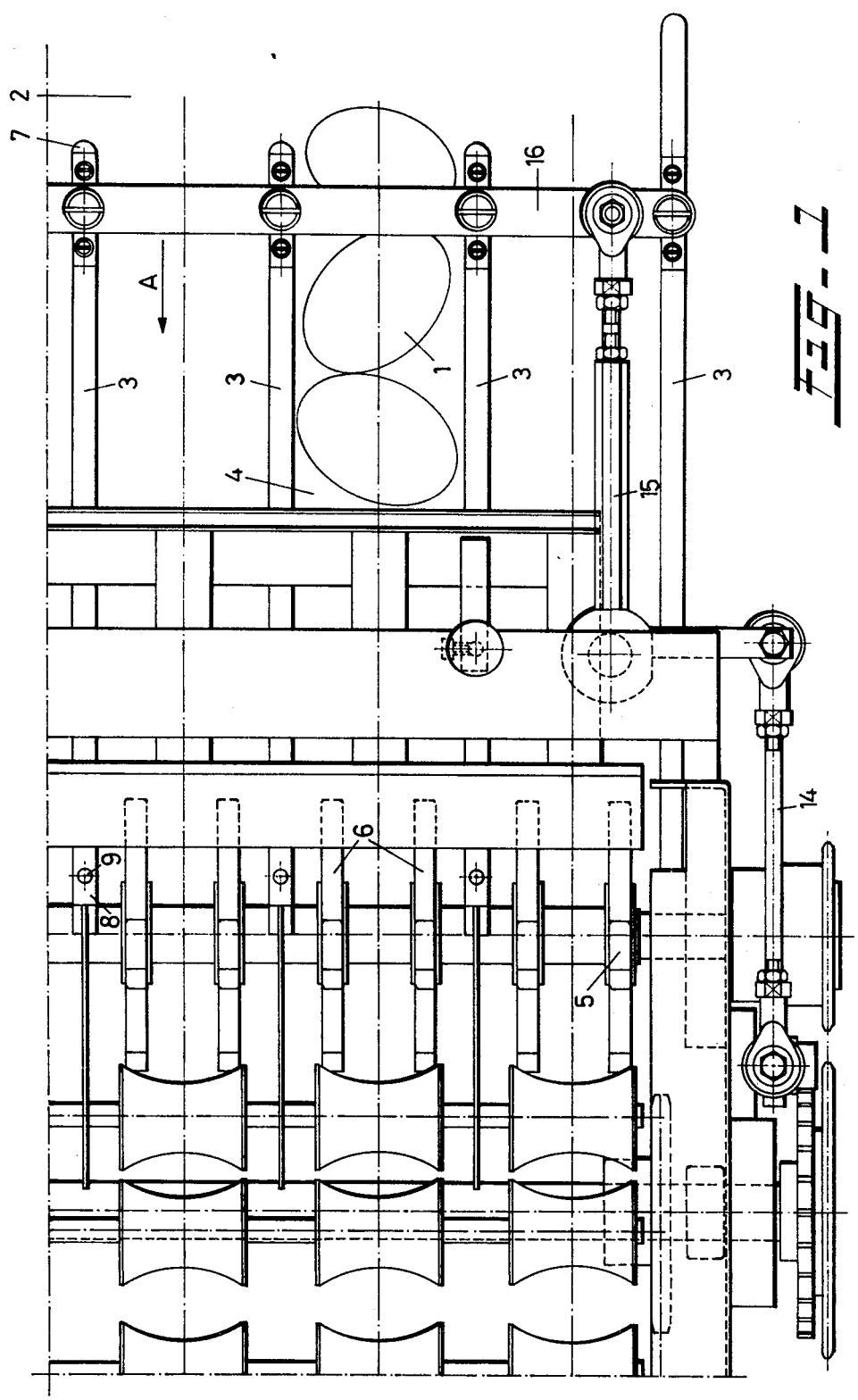
Figure 2:
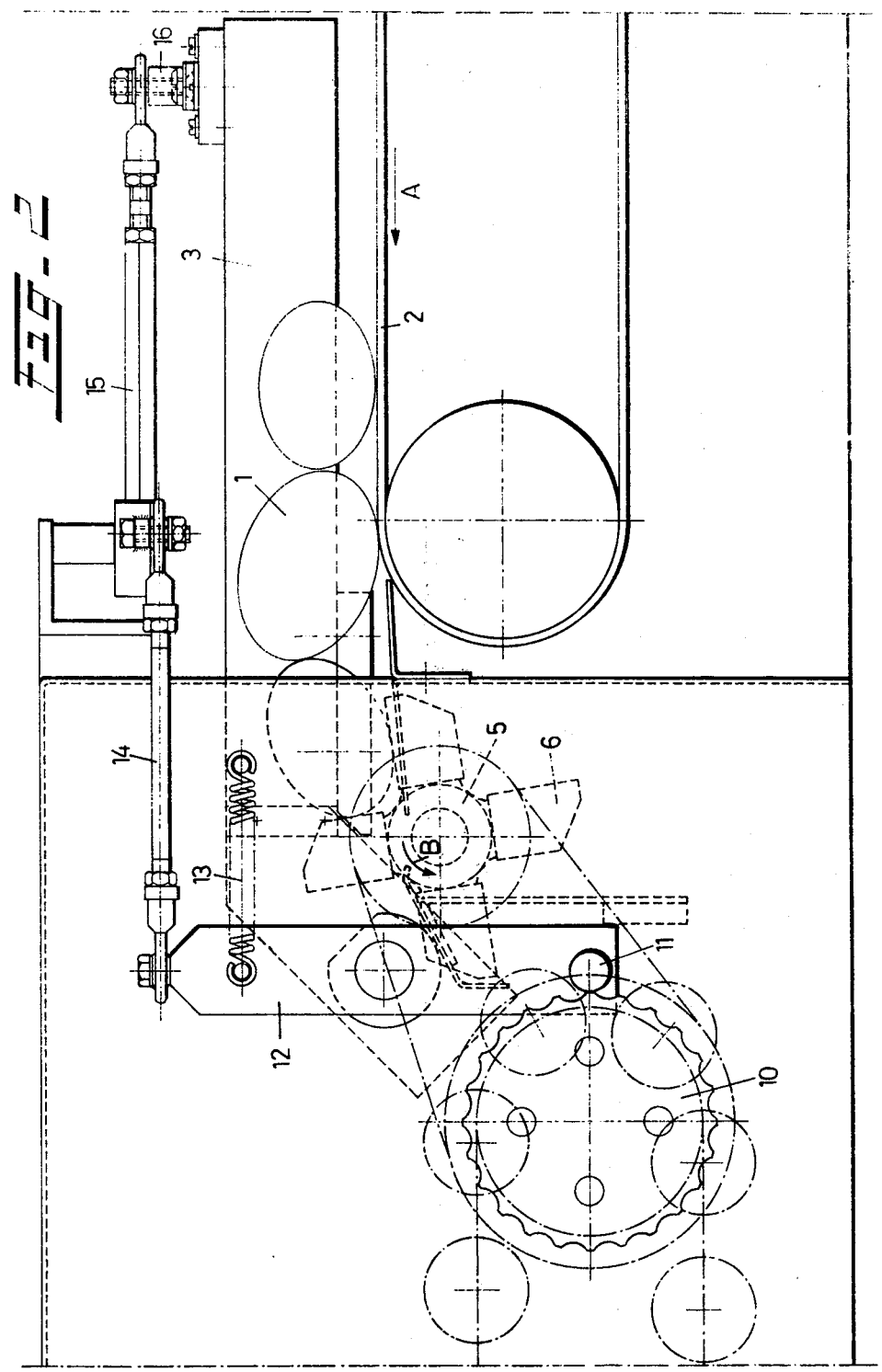
FIG. 2 shows a sideview of the apparatus of FIG. 1.

Referring to FIGS. 1 and 2, rollable articles 1 of different sizes, such as eggs, are supplied in a random arrangement on a conveyor belt 2, which transports the articles in the direction of arrow A. Arranged above the conveyor belt 2 are vertical partitions 3, forming sidewalls of channels 4 for guiding the articles towards a transporting roller 5. As the articles are supplied, roller 5 rotates in the direction of arrow B, see FIG. 2. Roller 5 is provided with holder units 6 forming cavities or cells for receiving the articles. Each channel 4 corresponds with the cavities arranged in one circle of rotation. The articles 1, which in the channels 4 are still on conveyor belt 2, will push preceding articles into the cavities of roller 5. It will be clear that the row of articles formed in the channels must be a closed row so that each cavity of roller 5 may be filled. Since the machine handles vulnerable articles, the various parts which engage the articles are appropriately shaped and/or suitable covered in known manner.

In order that a closed row of articles is formed, no stagnation must occur at the upstream ends of the channels in arranging the randomly supplied articles into rows between the vertical partitions 3. It is possible, however, that two articles become jammed between the upstream ends 7 of two partitions 3 defining the same channel. To prevent this, the vertical partitions 3 are horizontally pivotable through a slight angle about pivot shafts 9 located closely to their downstream ends 8. By virtue of this arrangement, the upstream ends 7 can be horizontally reciprocated over a small distance of, for example, 5 mm transversely to the direction of transport, while the downstream ends 8 will at all times continue to occupy their proper position relative to transporting roller 5.

The drive means for reciprocating the downstream ends 7 of partitions 3 is a gear 10 mounted on the shaft of roller 5 for cooperation with a pin 11 of a twin-armed lever 12, the pin 11 being urged into contact with gear 10 by means of a spring 13 acting on lever 12. The upper end of twin-armed lever 12 is coupled through a rod 14 and a perpendicular lever 15 to a connecting rod 16, to which all vertical partitions 3 are pivoted. As roller 5 rotates, connecting rod 16 causes all vertical partitions 3 to perform an equal reciprocating movement through a small distance of, for example, 5 mm transverse to the direction of transport of the articles. If two articles are jammed between the upstream ends 7 of two adjacent partitions 3, the reciprocating movement of the ends 7 will release one of them, so that it can again be taken along by the conveyor belt. In this way, stagnation of the articles in front of the entrances to the channels is effectively and rapidly remedied, so that closed rows of articles are formed in the channels, and normally each cavity of roller 5 will be filled.

Figure 3:
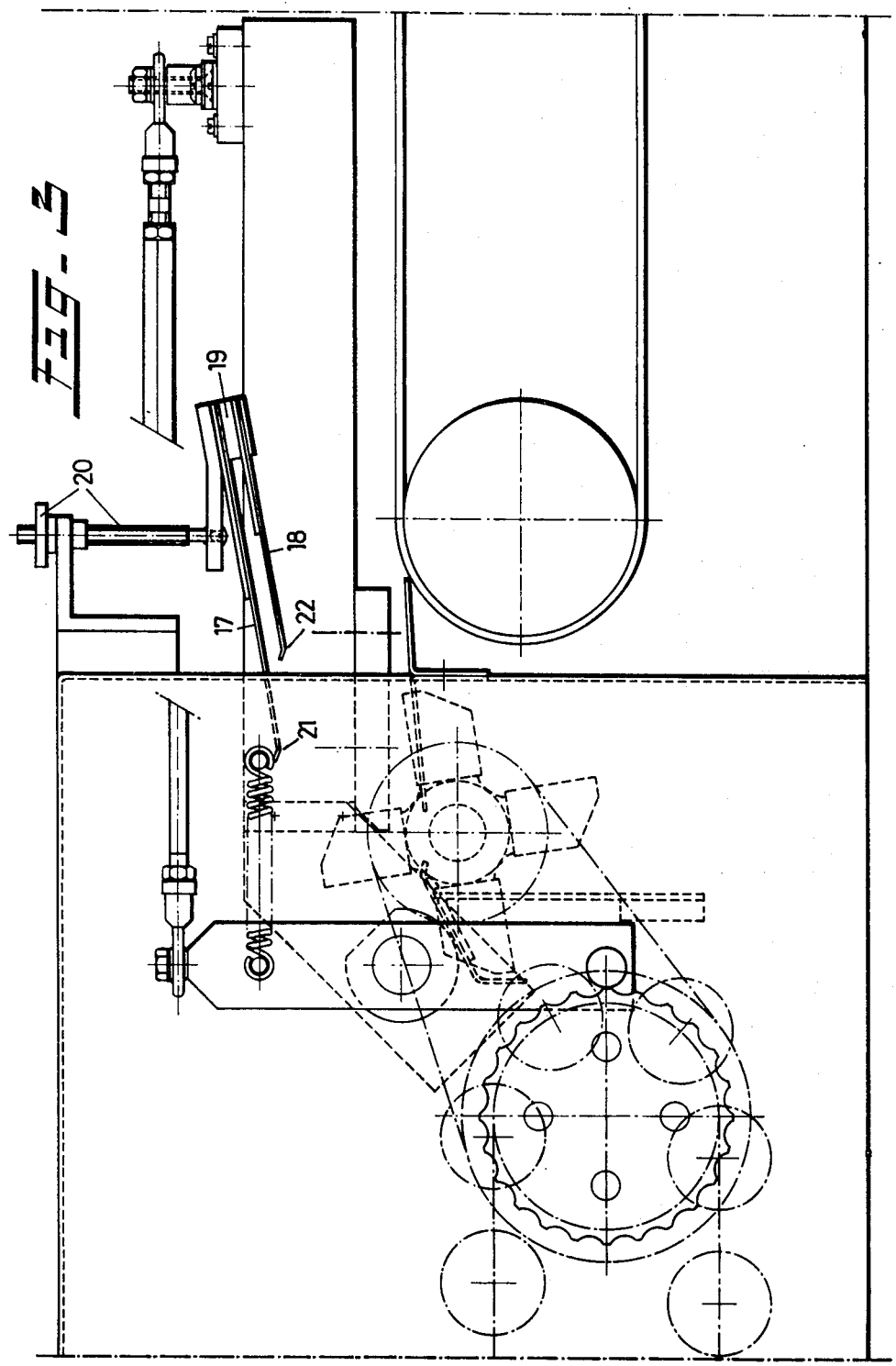
FIG. 3 shows a similar sideview, showing hold-down elements between the vertical partitions.

Provided at the downstream end of channels 4 at the top thereof, are hold-down elements 17 and 18, which are vertically movable and are downwardly inclined in the direction of transport of the articles. For the sake of simplicity, these hold-down elements are not shown in FIGS. 1 and 2. In the embodiment of FIG. 3, the elements 17, 18 take the form of band spring elements, the upstream end of which is rigidly secured to a carrying strip 19 suspended from an adjusting device 20 so as to be vertically adjustable. As a result of the elasticity of elements 17, 18 the free ends 21 and 22 thereof are movable up and down. Two respective elements 17 and 18 are mounted above each channel 4, one a short distance above the other, and in parallel relationship to one another. The ends 21 of the upper elements 17 extend over the cavities of roller 5 to be filled, and the free ends 22 of elements 18 terminate short of the ends 21 of elements 17 by a distance approximately equal to the average dimension of the articles supplied.

Figure 4:
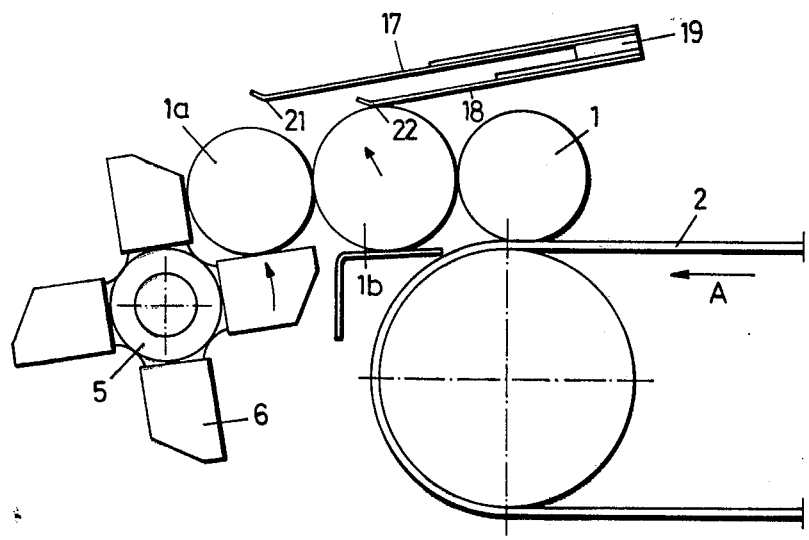
FIGS. 4 and 5 show, diagrammatically, a position of the hold-down elements relative to the conveyor belt and the transporting roller of the apparatus of FIG. 3.
Figure 5:
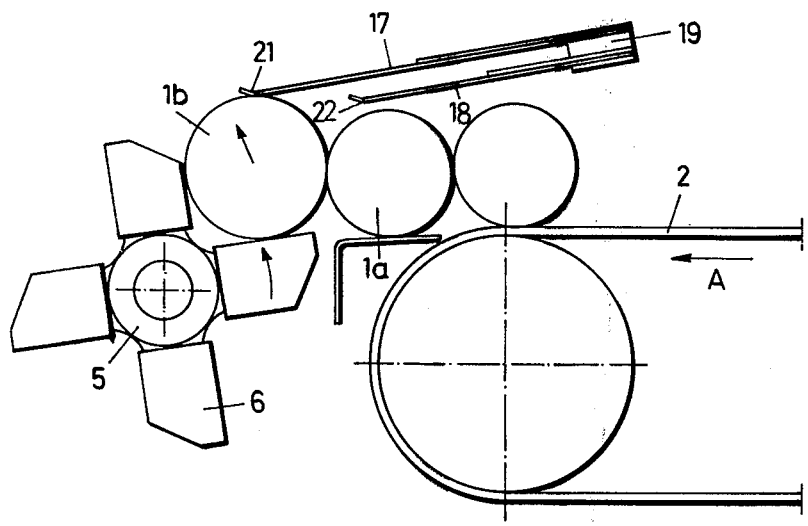

The purpose of the arrangement of the inclined spring elements 17 and 18 above each channel 4 will be described with particular reference to FIGS. 4 and 5. These figures show the case of non-uniformly sized articles 1 being supplied by conveyor belt 2. Thus article 1a, already contained in the cavity of roller 5 formed by holders 6, is smaller than the next article 1b. The article 1b is subjected to horizontal pressure from the next articles 1, while the reaction force exercised by the smaller article 1a on the larger article 1b is directed not horizontally but slightly upwardly. The two forces produce an upward component acting on the larger article 1b, which in the absence of element 18 would cause article 1b to be pushed upward. FIG. 5 shows the converse situation, in which the larger article 1b is in the cavity of roller 5 and smaller article 1a follows larger article 1b. In this case, for the same reason as described before, the larger article 1b tends to be pushed upwards from the cavity by the smaller article 1a. However, this is prevented by the inclined element 17.

It will be clear from the foregoing description that the free ends 21 and 22 of the respective inclined hold-down elements 17 and 18 must be horizontally spaced by a distance approximately equal to the average dimension of the articles.

In the apparatus according to the invention, the capacity of transporting roller 5 is used to a high extent, about 95 percent of the cavities being filled, by virtue of the fact that stagnation at the upstream ends of the partitions is rapidly remedied, so that closed rows of articles are formed in channels 4, while thanks to the provision of the inclined hold-down elements 17, 18 above the channels, the articles remain properly lined up even just in front of transporting roller 5, in spite of the greatly increased pressure between the articles close to the transporting roller, resulting from the summation of the pushing forces from the preceding articles in the rows in the channels on the conveyor belt.

I claim:

1. Apparatus for delivering rollable articles, such as eggs, said apparatus including means for spacing and intermittently removing said articles and for delivering said articles to means further acting thereon, said spacing means including an automatic loader of the type having a rotating transport roller which transports individual articles in cavities in the roller, a feed conveyor having a receiving end for receiving the articles in random fashion and a delivery end for delivering articles to the cavities of the transporting roller, a plurality of vertical partitions extending in the direction of article transport so as to have upstream and downstream ends, said partitions being disposed above the delivery end of said conveyor and being horizontally spaced apart in side-by-side essentially parallel relationship to define a plurality of channels, each of which has a width such that only a single row of articles will be transported therethrough so that each channel delivers its respective row of articles to a given location on the transporting roller, means mounting each partition for pivotal movement about a separate vertical axis at its downstream end so that the upstream ends of the partitions are capable of performing a transverse reciprocating movement relative to said conveyor; means for imparting continuous reciprocating pivotal movement to said partitions such that the upstream ends of said partitions move through a small distance which is much less than the width of the channels thereby preventing jamming of the randomly disposed articles as they enter the channels; and means for preventing said rollable articles from moving more than a small amount upwardly off said conveyor while they are temporarily retained at the delivery end of each channel before removal by said transport roller and without necessarily retarding forward movement thereof, said means comprising at least two resilient vertically adjustable hold-down elements arranged over the delivery end of each channel at different heights and each inclined downwardly in the direction of transport from a fixed end thereof, the upper one of said elements terminating in a free end beyond the free end of the lower one in the direction of transport, the free ends of said hold-down elements being horizontally spaced from each other in the direction of transport by a distance approximately equal to the average dimension of the articles to prevent an upward movement of an article.

2. Apparatus as in claim 1 wherein the free ends of the upper hold-down elements extend over the cavities of the transport roller and wherein the free ends of the lower hold-down elements terminate short of the cavities of the transport roller.

* * * * *

UNITED STATES PATENT OFFICE
CERTIFICATE OF CORRECTION

Patent No. 3,874,494     Dated April 1, 1975

Inventor(s) Leonardus Johannes TEMMING

It is certified that error appears in the above-identified patent and that said Letters Patent are hereby corrected as shown below:

In the patent heading, section [30], the priority date should be given as follows:

--Feb. 10, 1970--

Signed and Sealed this nineteenth Day of August 1975

[SEAL]

Attest:

RUTH C. MASON
*Attesting Officer*

C. MARSHALL DANN
*Commissioner of Patents and Trademarks*